United States Patent
Konno et al.

(10) Patent No.: US 11,859,044 B2
(45) Date of Patent: Jan. 2, 2024

(54) POLYISOCYANATE COMPOUND, POLYURETHANE RESIN FORMING COMPOSITION USING SAME, AND CURED PRODUCT OF SAID COMPOSITION

(71) Applicant: DAICEL CORPORATION, Osaka (JP)

(72) Inventors: Takashi Konno, Tokyo (JP); Jun Watanabe, Tokyo (JP); Shintarou Hatanaka, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 17/800,759

(22) PCT Filed: Feb. 17, 2021

(86) PCT No.: PCT/JP2021/005901
§ 371 (c)(1),
(2) Date: Aug. 18, 2022

(87) PCT Pub. No.: WO2021/166953
PCT Pub. Date: Aug. 26, 2021

(65) Prior Publication Data
US 2023/0108643 A1 Apr. 6, 2023

(30) Foreign Application Priority Data
Feb. 20, 2020 (JP) .................... 2020-026827

(51) Int. Cl.
| | | |
|---|---|---|
| C08G 18/79 | (2006.01) | |
| C08G 18/62 | (2006.01) | |
| C09D 175/12 | (2006.01) | |
| C08J 7/04 | (2020.01) | |
| C08G 18/75 | (2006.01) | |
| C08J 7/046 | (2020.01) | |
| C09D 175/06 | (2006.01) | |
| C08G 18/46 | (2006.01) | |

(Continued)

(52) U.S. Cl.
CPC ............ *C08G 18/79* (2013.01); *C08G 18/10* (2013.01); *C08G 18/4661* (2013.01); *C08G 18/6229* (2013.01); *C08G 18/73* (2013.01); *C08G 18/755* (2013.01); *C08J 7/046* (2020.01); *C08J 7/0423* (2020.01); *C09D 175/06* (2013.01); *C09D 175/12* (2013.01); *C08G 2150/00* (2013.01); *C08J 2367/02* (2013.01); *C08J 2475/06* (2013.01)

(58) Field of Classification Search
CPC ............... C08G 18/79; C08G 18/6229; C08G 2150/00; C08G 18/10; C08G 18/73; C08G 18/755; C08G 18/4661; C09D 175/12; C09D 175/06; C08J 2367/02; C08J 2475/06; C08J 7/0423; C08J 7/046
See application file for complete search history.

(56) References Cited

FOREIGN PATENT DOCUMENTS

| JP | 61-28518 A | 2/1986 |
|---|---|---|
| JP | 4-130119 A | 5/1992 |

(Continued)

OTHER PUBLICATIONS

International Preliminary Report on Patentability and Written Opinion of the International Searching Authority dated Aug. 23, 2022, in PCT/JP2021/005901.

(Continued)

*Primary Examiner* — Rabon A Sergent
(74) *Attorney, Agent, or Firm* — Birch, Stewart, Kolasch & Birch, LLP

(57) ABSTRACT

Provided are a composition capable of forming a cured product with excellent hardness, scratch resistance, chemical resistance, and flexibility; and a polyisocyanate compound that can be used as a curing agent for the composition. The polyisocyanate compound is represented by Formula (1), wherein $R^1$ to $R^3$ are identical or different and are a group represented by Formula (1a), wherein $L^1$ and $L^2$ are identical or different and represent an alkylene group having from 1 to 10 carbons, m represents a number of 0 or greater, $L^3$ represents a divalent hydrocarbon group having from 4 to 18 carbons, and X represents an isocyanate group or a blocked isocyanate group blocked with a blocking agent, where m is not simultaneously 0 for $R^1$ to $R^3$, and the bond with the wavy line bonds to a nitrogen atom in Formula (1). In addition, the composition contains a polyisocyanate compound and a polyacrylic polyol.

[Chem. 1]

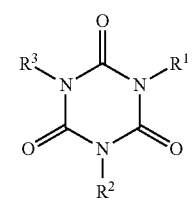

(1)

[Chem. 2]

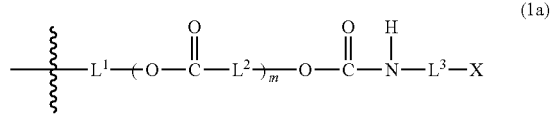

(1a)

14 Claims, No Drawings

(51) Int. Cl.
*C08G 18/73* (2006.01)
*C08G 18/10* (2006.01)

(56) References Cited

FOREIGN PATENT DOCUMENTS

| | | |
|---|---|---|
| JP | 11-42746 A | 2/1999 |
| JP | 2013-1897 A | 1/2013 |

OTHER PUBLICATIONS

International Search Report dated Apr. 13, 2021, in PCT/JP2021/005901.

POLYISOCYANATE COMPOUND, POLYURETHANE RESIN FORMING COMPOSITION USING SAME, AND CURED PRODUCT OF SAID COMPOSITION

TECHNICAL FIELD

The present disclosure relates to a polyisocyanate compound, a composition for forming a polyurethane resin, the composition formed using the polyisocyanate compound, and a cured product of the composition. The present application claims priority to JP 2020-026827 filed in Japan on Feb. 20, 2020, the contents of which are incorporated herein by reference.

BACKGROUND ART

Polyurethane resins have flexibility, elasticity, and strength. Thus, compositions for molding a polyurethane resin are widely used in coating agents and the like. The coating agent, for example, a coating agent used in an application of covering a plastic substrate constituting a component, such as a vehicle member or an electronic device, is required to be able to form a coating having scratch resistance for the substrate and flexibility. Such coating agents known in the art include a composition for forming a polyurethane resin described in Patent Documents 1 and 2, the composition containing a polyisocyanate compound and a polyacrylic polyol, the polyisocyanate compound obtained by reacting a polyol and a diisocyanate, the polyol being a caprolactone-modified product of tris(2-hydroxyethyl) isocyanurate.

However, when an agent, such as a sunscreen agent, comes into contact with a coating composed of a polyurethane resin, the appearance of the coating deteriorates, which has been a problem in recent years.

CITATION LIST

Patent Document

Patent Document 1: JP 11-042746 A
Patent Document 2: JP 61-028518 A

SUMMARY OF INVENTION

Technical Problem

Thus, an object of the present disclosure is to provide a polyisocyanate compound that can be used as a curing agent for a composition capable of forming a cured product with excellent hardness, scratch resistance, chemical resistance, and flexibility. Another object of the present disclosure is to provide a composition capable of forming a cured product with excellent hardness, scratch resistance, chemical resistance, and flexibility. Yet another object of the present disclosure is to provide a cured product with excellent hardness, scratch resistance, chemical resistance, and flexibility. Still another object of the present disclosure is to provide a plastic molded product in which at least a portion of the surface is covered with a cured product with excellent hardness, scratch resistance, chemical resistance, and flexibility.

Solution to Problem

As a result of diligent research to solve the above problem and objects, the present inventors found that a polyurethane resin obtained by reacting a polyisocyanate compound having an isocyanurate group and a polyacrylic polyol has excellent hardness, scratch resistance, and flexibility, and also has excellent chemical resistance. The present disclosure has been completed based on these findings.

Specifically, the present disclosure provides a polyisocyanate compound represented by Formula (1) below: wherein $R^1$ to $R^3$ in Formula (1) are identical or different and are a group represented by Formula (1a) below, wherein in Formula (1a), $L^1$ and $L^2$ are identical or different and represent an alkylene group having from 1 to 10 carbons, m represents a number of 0 or greater, $L^3$ represents a divalent hydrocarbon group having from 4 to 18 carbons, and X represents an isocyanate group or a blocked isocyanate group blocked with a blocking agent, where m is not simultaneously 0 for $R^1$ to $R^3$, and the bond with the wavy line bonds to a nitrogen atom in Formula (1).

[Chem. 1]

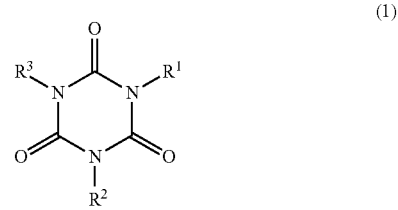

(1)

[Chem. 2]

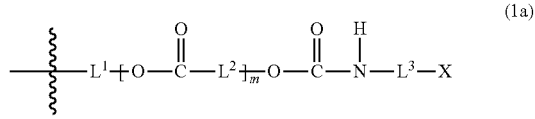

(1a)

The present disclosure also provides the polyisocyanate compound with an isocyanate group concentration of 6 to 14 wt. %.

The present disclosure also provides a composition for forming a polyurethane resin, the composition containing the polyisocyanate compound and a polyacrylic polyol.

The present also disclosure provides the composition for forming a polyurethane resin, wherein an equivalent ratio of a total of isocyanate groups and blocked isocyanate groups of the polyisocyanate compound to hydroxyl groups in the polyacrylic polyol((isocyanate groups+blocked isocyanate groups)/hydroxyl groups) in the composition is from 0.5 to 2.0.

The present disclosure also provides the composition for forming a polyurethane resin, wherein the composition is a coating agent.

The present disclosure also provides a cured product of the composition for forming a polyurethane resin.

The present disclosure also provides a plastic molded product, wherein a coating composed of the cured product covers at least a portion of a surface of the plastic molded product.

Advantageous Effects of Invention

The polyisocyanate compound of the present disclosure can be used as a curing agent in a composition for forming a polyurethane resin, the composition to form a cured product with excellent hardness, scratch resistance, chemical resistance, and flexibility. Using the composition for forming a polyurethane resin of the present disclosure as a coating agent to cover a substrate enables the substrate to have hardness, scratch resistance, and chemical resistance by a coating of a cured product, the coating having excellent flexibility and being less likely to peel off.

The plastic molded product in which at least a portion of its surface is covered with the cured product of the composition for forming a polyurethane resin of the present disclosure has high surface hardness and has excellent scratch resistance and chemical resistance. Thus, even if the plastic molded article is touched, for example, by a hand to which a sunscreen agent adheres, the cured product covering the surface of the plastic molded article does not peel off or not exhibit a white cloudiness, and the plastic molded article can retain excellent appearance, hardness, and scratch resistance over a long period of time.

DESCRIPTION OF EMBODIMENTS

Embodiments of the present disclosure will be described in detail below.

Polyisocyanate Compound

A polyisocyanate compound of the present disclosure is a polyisocyanate compound having an isocyanurate group represented by Formula (1) below. $R^1$ to $R^3$ in Formula (1) are identical or different and are a group represented by Formula (1a) below. In Formula (1a), $L^1$ and $L^2$ are identical or different and represent an alkylene group having from 1 to 10 carbons, m represents a number of 0 or greater, $L^3$ represents a divalent hydrocarbon group having from 4 to 18 carbons, and X represents an isocyanate group or a blocked isocyanate group blocked with a blocking agent. m is not simultaneously 0 for $R^1$ to $R^3$, and the bond with the wavy line bonds to a nitrogen atom in Formula (1).

[Chem. 3]

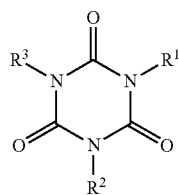

(1)

[Chem. 4]

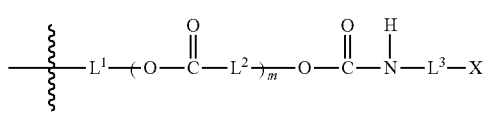

(1a)

Examples of the alkylene group having from 1 to 10 carbons in $L^1$ and $L^2$ above include linear or branched alkylene groups, such as a methylene group, a methylmethylene group, a dimethylmethylene group, an ethylene group, a propylene group, a trimethylene group, a butylene group, a 1-methyltrimethylene group, a 2-methyltrimethylene group, a 1,1'-dimethylethylene group, a pentylene group, a hexylene group, a heptylene group, an octylene group, a 2-ethylhexylene group, a nonylene group, and a decylene group.

$L^1$ above is among others preferably an alkylene group having from 1 to 3 carbons and more preferably an ethylene group.

$L^2$ above is among others preferably an alkylene group having from 1 to 8 carbons and more preferably an alkylene group having from 4 to 6 carbons. In addition, the alkylene group is preferably a linear alkylene group.

$L^3$ above is a divalent hydrocarbon group having from 4 to 18 carbons and preferably a divalent aliphatic hydrocarbon group having from 4 to 18 carbons, a divalent alicyclic hydrocarbon group having from 4 to 18 carbons, or a divalent aromatic hydrocarbon group having from 6 to 18 carbons.

Examples of the divalent aliphatic hydrocarbon group having from 4 to 18 carbons include a tetramethylene group, a pentamethylene group, a hexamethylene group, a heptamethylene group, an octamethylene group, a nonamethylene group, a trimethylhexamethylene group, and a decamethylene group. Among these, a divalent aliphatic hydrocarbon group having from 6 to 12 carbons is more preferred, and a hexamethylene group is even more preferred.

The divalent alicyclic hydrocarbon group having from 4 to 18 carbons is a group formed by removing two hydrogen atoms from an alicyclic hydrocarbon having from 4 to 18 carbons, and examples include a 1,3-cyclohexylene group, 1,4-cyclohexylene group, 1,3-cyclohexanedimethylene group, 1,4-cyclohexanedimethylene group, 4,4'-dicyclohexylmethane diisocyanate residue, and an isophorone residue. Among these, a divalent alicyclic hydrocarbon group having from 6 to 10 carbons is more preferred, and an isophorone residue is even more preferred.

The divalent aromatic hydrocarbon group having from 6 to 18 carbons is a group formed by removing two hydrogen atoms from a divalent aromatic hydrocarbon group having from 6 to 18 carbons, and examples include a methylphenylene group, a methane diphenylene group, an ethane phenylene group, a naphthylene group, a dimethylphenylene group, and a phenylene group.

m above is an average value of the degree of polymerization of the unit indicated by parentheses in Formula (1a) and is a number of 0 or greater, for example, of 0 to 7.0, preferably of 1.0 to 4.0, and more preferably of 1.0 to 3.0.

The isocyanate group concentration of the polyisocyanate compound of the present disclosure is preferably from 6 to 14 wt. %, more preferably from 7 to 13 wt. %, even more preferably from 8 to 12 wt. %, and particularly preferably from 9 to 12 wt. %.

The isocyanate group concentration can be calculated in accordance with HS K 1603-1A method by adding a tetrahydrofuran (THF) solution of dibutylamine (0.1 mol/L) to a sample diluted with THF to completely react isocyanate groups with an excess amount of dibutylamine (ureation), and then back-titrating the unreacted residual dibutylamine with a standard hydrochloric acid titration solution (0.1 mol/L).

With the isocyanate group concentration of lower than 6 wt. %, the resulting polyurethane resin would tend to have lower chemical resistance, and with the isocyanate group concentration of higher than 14 wt. %, the resulting polyurethane resin would tend to have lower flexibility.

Some or all of the isocyanate groups of the isocyanate compound of the present disclosure may be blocked isocyanate groups blocked with a blocking agent. The blocked isocyanate group is formed by reaction of the isocyanate group with a blocking agent. Exposing the blocked isocyanate group to heating during thermal curing dissociates the blocking agent from the blocked isocyanate group and regenerates the isocyanate group.

Examples of the blocking agent include imidazole-based compounds, alcohol-based compounds, phenol-based compounds, active methylene-based compounds, oxime-based compounds, lactam-based compounds, amine-based compounds, pyrazole-based compounds, and bisulfites.

Examples of the imidazole-based compound include imidazole, benzimidazole, 2-methylimidazole, 4-methylimidazole, and 2-ethylimidazole.

Examples of the alcohol-based compound include methanol, ethanol, isopropanol, n-butanol, 2-ethoxyhexanol, 2-N,N-dimethylaminoethanol, 2-ethoxyethanol, cyclohexanol, butyl cellsolve, and ethyl cellsolve.

Examples of the phenol-based compound include phenol, cresol, n-propylphenol, isopropylphenol, n-butylphenol, sec-butylphenol, tert-butylphenol, n-hexylphenol, nitrophenol, chlorophenol, cresol, and methyl 4-hydroxybenzoate.

Examples of the active methylene-based compound include Meldrum's acid, acetylacetone, methyl acetoacetate, dimethyl malonate, ethyl cyanoacetate, and methyl isobutanoylacetate.

Examples of the oxime-based compound include acetoxime, methyl ethyl ketoxime, methyl isobutyl ketoxime, and 2-heptanone oxime.

Examples of the lactam-based compound include ε-caprolactam, δ-valerolactam, γ-butyrolactam, and β-propiolactam.

Examples of the amine-based compound include dibutylamine, 4-phenylbutylamine, and 6-methyl-2-piperidine.

Examples of the pyrazole-based compound include pyrazole, 3,5-dimethylpyrazole, and 3,5-diisopropylpyrazole.

Examples of the bisulfate include sodium bisulfate.

The blocking agent is preferably an alcohol-based compound or an active methylene-based compound from the viewpoints of low-temperature curability, chemical resistance, and flexibility.

One blocking agent can be used alone or two or more in combination.

The isocyanate group concentration when the polyisocyanate compound of the present disclosure has a blocked isocyanate group is a value obtained for a compound in which the blocked isocyanate group is replaced with an isocyanate group.

The polyisocyanate compound of the present disclosure may contain a multimer (from a dimer to a hexamer) having a plurality of isocyanurate groups.

The multimer is a compound in which two or more polyisocyanate compounds represented by Formula (1) above and a polyester polyol compound (1') below are bonded by reaction of a terminal isocyanate group and a terminal hydroxyl group, where the isocyanurate groups are linked by a group represented by Formula (1b) below. In Formula (1b), $L^1$, $L^2$, $L^3$, and m are identical to $L^1$, $L^2$, $L^3$, and m in Formula (a) above, and two bonds with the wavy line each bonds to a nitrogen atom of the isocyanurate group.

alicyclic diisocyanates, and aromatic diisocyanates. The polyol and the diisocyanate are preferably reacted in an equivalent ratio of isocyanate groups of the diisocyanate to hydroxyl groups of the polyol compound (isocyanate groups/hydroxyl groups) ranging from 5 to 40, more preferably from 6 to 30, and even more preferably from 7 to 20. Reacted in an equivalent ratio (isocyanate groups/hydroxyl groups) within the above range, the polyester polyol compound (1') below and the diisocyanate above do not excessively react and are more likely to react in a molar ratio of 1 to 3 (polyol compound/diisocyanate=1/3), and thus this makes it easier to obtain a polyisocyanate compound, which is a monomer having three isocyanate groups. The unreacted diisocyanate is removed by distillation, extraction, or the like, but the polyisocyanate compound of the present disclosure may contain 1.0 wt. % or lower of the unreacted diisocyanate.

Polyol

The polyol is a polyester polyol compound represented by Formula (1') below. $R^{1'}$ to $R^{3'}$ in the formula are identical or different and are a group represented by Formula (1a') below. $L^1$, $L^2$, and m in Formula (1a') are identical to $L^1$, $L^2$, and m in Formula (1a) above.

[Chem. 6]

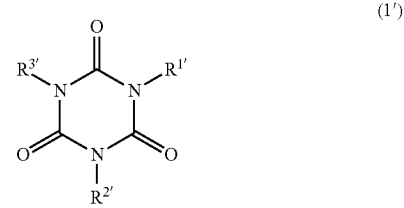

(1')

[Chem. 7]

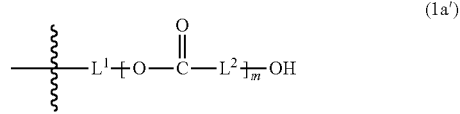

(1a')

The number average molecular weight (Mn: in terms of standard polystyrene) of the polyester polyol compound (1') is preferably from 570 to 2000, more preferably from 580 to 1500, even more preferably from 590 to 1200, particularly preferably from 590 to 1100, and most preferably from 590 to 900.

In addition, the molecular weight dispersity (weight average molecular weight Mw/number average molecular weight Mn) of the polyester polyol compound (1') is, for example, from 1.0 to 3.0.

[Chem. 5]

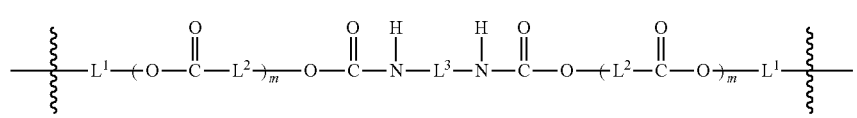

(1b)

The polyisocyanate compound of the present disclosure can be produced, for example, by reacting a polyester polyol compound (1') below having an isocyanurate group with at least one diisocyanate selected from aliphatic diisocyanates, The hydroxyl value (KOH mg/g) of the polyester polyol (1') is, for example, from 80 to 400 KOH mg/g, and in this range, from the viewpoints of being able to improve scratch resistance and chemical resistance of the resulting cured product, the hydroxyl value is preferably from 110 to 350 KOH mg/g, more preferably from 150 to 300 KOH mg/g, even more preferably from 160 to 290 KOH mg/g, and particularly preferably from 180 to 285 KOH mg/g. The hydroxyl value can be measured by the hydroxyl value measurement method described in JIS-K1557.

The polyester polyol compound (1') can be produced, for example, by ring-opening polymerization of a lactone using a hydroxyl group of a compound (1") represented by Formula (1") below as a starting point. $L^1$ in Formula (1") is identical to $L^1$ in Formula (1a) and Formula (1a').

[Chem. 8]

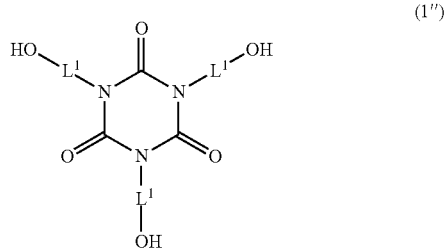

(1")

Examples of the lactone include α-acetolactone, β-propiolactone, γ-butyrolactone, δ-valerolactone, and ε-caprolactone.

The number average molecular weight and the molecular weight dispersity (weight average molecular weight Mw/number average molecular weight Mn) of the polyester polyol compound (1') can be measured with the following instrument and conditions.

Measurement instrument: a high-speed GPC instrument "HLC-8220 GPC", available from Tosoh Corporation
Mobile phase: tetrahydrofuran Diisocyanate The diisocyanate used in the present disclosure is a diisocyanate having from 4 to 18 carbons and preferably at least one selected from aliphatic diisocyanates having from 4 to 18 carbons, alicyclic diisocyanates having from 4 to 18 carbons, and aromatic diisocyanates having from 6 to 18 carbons. The number of carbons of the diisocyanate is the number not including two carbons involved in the isocyanate group.

Examples of the aliphatic diisocyanate having from 4 to 18 carbons include 1,4-tetramethylene diisocyanate, 1,5-pentamethylene diisocyanate, 1,6-hexamethylene diisocyanate, 1,7-heptamethylene diisocyanate, 1,8-octamethylene diisocyanate, 1,9-nonamethylene diisocyanate, 2,2,4-trimethylhexamethylene diisocyanate, 2,4,4-trimethylhexamethylene diisocyanate, and 1,10-decamethylene diisocyanate.

Examples of the alicyclic diisocyanate having from 4 to 18 carbons include 1,3-cyclohexane diisocyanate, 1,4-cyclohexane diisocyanate, 1,3-bis(isocyanatomethyl)cyclohexane, 1,4-bis(isocyanatomethyl)cyclohexane, 4,4'-dicyclohexylmethane diisocyanate, isophorone diisocyanate, and norbornene diisocyanate.

In addition, examples of the aromatic diisocyanate having from 6 to 18 carbons include tolylene diisocyanate (TDI), diphenylmethane diisocyanate (MDI), 4,4'-dibenzyl diisocyanate, 1,5-naphthylene diisocyanate, xylylene diisocyanate, 1,3-phenylene diisocyanate, and 1,4-phenylene diisocyanate. Examples of the diphenylmethane diisocyanate include 2,2'-diphenylmethane diisocyanate, 2,4'-diphenylmethane diisocyanate, and 4,4'-diphenylmethane diisocyanate.

Composition for Forming Polyurethane Resin

The composition for forming a polyurethane resin of the present disclosure contains the polyisocyanate compound as a curing agent, and a polyacrylic polyol.

From the viewpoint of being able to improve scratch resistance and chemical resistance of the resulting cured product, the polyisocyanate compound and the polyacrylic polyol are blended in an equivalent ratio of a total of isocyanate groups and blocked isocyanate groups contained in the polyisocyanate compound to hydroxyl groups contained in the polyacrylic polyol ((isocyanate groups+ blocked isocyanate groups)/hydroxyl groups) of preferably from 0,5 to 2.0, more preferably from 0.5 to 1.5, even more preferably from 0.7 to 1.3, and particularly preferably from 0.9 to 1.2.

In addition, the content of the polyacrylic polyol in the composition is, from the viewpoint of being able to improve scratch resistance and chemical resistance of the resulting cured product, preferably from 100 to 400 parts by weight, more preferably from 150 to 350 parts by weight, and even more preferably from 200 to 300 parts by weight per 100 parts by weight of the polyisocyanate compound.

Polyacrylic polyol

The polyacrylic polyol can be produced by copolymerizing a (meth)acrylic compound having a hydroxyl group and another (meth)acrylic compound other than the above (meth)acrylic compound having a hydroxyl group. Examples of the (meth)acrylic compound having a hydroxyl group include 2-hydroxyethyl (meth)acrylate, 3-hydroxypropyl (meth)acrylate, and 4-hydroxybutyl (meth)acrylate. Among these, 2-hydroxyethyl (meth)acrylate is preferably used. One of these can be used alone, or two or more in combination.

Examples of another (meth)acrylic compound above include (meth)acrylic acid, methyl (meth)acrylate, ethyl (meth)acrylate, n-butyl (meth)acrylate, isobutyl (meth)acrylate, tert-butyl (meth)acrylate, neopentyl (meth)acrylate, 2-ethylhexyl (meth)acrylate, octyl (meth)acrylate, stearyl (meth)acrylate, isostearyl (meth)acrylate, cetyl (meth)acrylate, lauryl (meth)acrylate, 2,2,2-trifluoroethyl (meth)acrylate, 2,2,3,3-tetrafluoropropyl (meth)acrylate, 1H,1H,5H-octafluoropentyl (meth)acrylate, 2-(perfluorooctyl)ethyl (meth)acrylate, cyclohexyl (meth)acrylate, dicyclopentanyl (meth)acrylate, dicyclopentenyloxyethyl (meth)acrylate, poly(ethylene glycol) mono(meth)acrylate, methoxyethyl (meth)acrylate, methoxybutyl (meth)acrylate, methoxy triethylene glycol (meth)acrylate, methoxy poly(ethylene glycol) (meth)acrylate, benzyl (meth)acrylate, 2-ethyl-2-methyl-[1,3]-dioxolan-4-yl-methyl (meth)acrylate, dimethylaminoethyl (meth)acrylate, and isobornyl (meth)acrylate. Among these, a (meth)acrylate having an alkyl group having from 1 to 10 carbons is preferred, and methyl (meth)acrylate or n-butyl (meth)acrylate is more preferred. One of these can be used alone, or two or more in combination.

The hydroxyl value of the polyacrylic polyol is preferably from 30 to 100 KOH mg/g and more preferably from 40 to 80 KOH mg/g.

With the hydroxyl value of the polyacrylic polyol of lower than 30 KOH mg/g, the resulting polyurethane resin would tend to have lower chemical resistance, and with the hydroxyl value of the polyacrylic polyol of higher than 100 KOH mg/g, the resulting polyurethane resin would tend to have lower flexibility.

The composition for forming a polyurethane resin of the present disclosure may further contain as necessary an inorganic particle, an organic particle, an additive, a catalyst, or the like.

Inorganic Particle

Examples of the inorganic particle that the composition for forming a polyurethane resin of the present disclosure may further contain include silica, alumina, mica, synthetic mica, talc, calcium oxide, calcium carbonate, zirconium oxide, titanium oxide, barium titanate, kaolin, bentonite, diatomaceous earth, boron nitride, aluminum nitride, silicon carbide, zinc oxide, cerium oxide, cesium oxide, magnesium oxide, glass beads, glass fibers, graphite, carbon nanotubes, calcium hydroxide, magnesium hydroxide, and aluminum hydroxide. Among these, silica is preferred from the viewpoint of being able to improve chemical resistance and scratch resistance of the resulting cured product.

Organic Particle

Examples of the organic particle that the composition for forming a polyurethane resin of the present disclosure may further contain include polyethylene wax, polypropylene wax, acrylic beads, and urethane beads. Among these, a urethane bead is preferred from the viewpoint of improving the texture (soft feel properties) of the coating.

Regardless of inorganic or organic, one type of these particles can be used alone, or two or more types in combination.

The particle sizes of the inorganic particle and the organic particle are not particularly limited but are preferably from 0.01 nm to 1 μm from the viewpoint of good appearance.

Additive

Examples of the additive that the composition for forming a polyurethane resin of the present disclosure may further contain include surfactants, pigments, dyes, ultraviolet absorbers, light stabilizers, surface modifiers, antifoaming agents, wetting agents, dispersants, viscoelasticity modifiers, thixotropy-imparting agents, antiseptics, film-forming agents, plasticizers, penetrants, perfumes, bactericides, fungicides, antioxidants, antistatic agents, flame retardants, and matting agents.

The contents of the inorganic particle, organic particle, and additive in the composition for forming a polyurethane resin of the present disclosure is not particularly limited but is preferably 10 wt. % or lower relative to a total weight (100 wt. %) of non-volatile content of the composition.

Catalyst

Examples of the catalyst that the composition for forming a polyurethane resin of the present disclosure may further contain include tin-based catalysts (such as stannous octoate and dibutyltin dilaurate); bismuth-based catalysts (such as bismuth neodecanoate and bismuth 2-ethylhexanoate); zirconia-based catalysts (such as zirconyl 2-ethylhexanoate and zirconyl naphthenate); other organometallic catalysts (such as phenylmercury propionate salt and lead octenoate); ammonium salt catalysts (such as tetraalkylammonium halides (such as tetramethylammonium chloride), tetraalkylammonium hydroxides (such as tetramethylammonium hydroxide salts), tetraalkylammonium organic salts (such as tetramethylammonium acetate salts, tetramethylammonium 2-ethylhexanoate salts, 2-hydroxypropyl trimethylammonium formate salts, and 2-hydroxypropyl trimethylammonium 2-ethylhexanoate salts)); and amine catalysts (such as triethylamine, triethylenediamine, diethanolamine, bis[2-(dimethylamino)ethyl]methylamine, dimethylamino morpholine, N-ethylmorpholine, and tetramethylguanidine). The blending amount of the catalyst is preferably from 0.001 to 0.5 parts by weight per 100 parts by weight of a total of the polyisocyanate compound and the polyacrylic polyol.

Solvent

A solvent is added to the composition for forming a polyurethane resin of the present disclosure, and the viscosity can be adjusted. Examples of the solvent include ester-based solvents, such as acetate esters (such as ethyl acetate and butyl acetate); ether-based solvents, such as dioxane and tetrahydrofuran; ketone-based solvents, such as acetone and methyl ethyl ketone, aromatic-based solvents, such as toluene and xylene; halogen-based solvents, such as dichloromethane and chloroform; alcohol-based solvents, such as methanol, ethanol, isopropanol, and butanol; nitrile-based solvents, such as acetonitrile and benzonitrile; and glycol-based solvents, such as alkylene glycol (such as ethylene glycol and propylene glycol), alkylene glycol monoalkyl ethers (such as ethylene glycol monomethyl ether and propylene glycol monomethyl ether), alkylene glycol dialkyl ethers (ethylene glycol dimethyl ether and propylene glycol dimethyl ether), and alkylene glycol monoalkyl ether monoalkyl esters (ethylene glycol monoethyl ether acetate and ethylene glycol monopropyl ether acetate). One of these can be used alone, or two or more in combination.

The content of the solvent in the composition for forming a polyurethane resin of the present disclosure is adjusted to give a solid content concentration in the composition preferably of 70 to 99 wt. % and more preferably of 80 to 95 wt. %. In addition, the content of the solvent is preferably from 5 to 20 parts by weight, more preferably from 7 to 17 parts by weight, and even more preferably from 9 to 15 parts by weight per 100 parts by weight of a total of the polyisocyanate compound and the polyacrylic polyol.

The composition for forming a polyurethane resin of the present disclosure can be produced by mixing the above components. The composition for forming a polyurethane resin of the present disclosure can be a two-component coating agent for which the polyisocyanate compound and the polyacrylic polyol are separately stored and mixed at the time of use.

In addition, the composition for forming a polyurethane resin of the present disclosure can be a one-component coating agent for which the polyisocyanate compound having a blocked isocyanate group and the polyacrylic polyol are mixed in advance and stored.

The composition for forming a polyurethane resin of the present disclosure has the above configuration, and thus heat treatment of the composition enables the polyisocyanate compound and the polyacrylic polyol to be urethane-bonded to form a cured product (i.e., a cured product composed of a polyurethane resin).

The heat treatment conditions are, for example, at 50 to 100° C. for approximately 10 to 240 minutes. After completion of the heat treatment, the cured product may be further aged at room temperature (from 1 to 30° C.) for approximately 12 to 60 hours.

The cured product thus obtained has excellent adhesion to a substrate (e.g., a plastic substrate, such as those of PET), scratch resistance, and flexibility.

The cured product has high hardness; the pencil hardness (by a method in accordance with JIS K5600) is, for example, preferably 4B or harder, more preferably 3B or harder, and even more preferably B or harder.

The cured product has excellent chemical resistance; for example, even if a sunscreen agent adheres to the cured product, the surface of the cured product does not swell or not exhibit a white cloudiness, and the cured product has excellent sunscreen resistance accordingly.

The cured product has the above properties in combination. Thus, the composition for forming the cured product is suitable as a coating agent for plastic molded products, such as extrusion-molded products, injection-molded products, and compression-molded products; and as a material for molded products, such as films. Examples of the plastic molded article include enclosures for home appliances (such as refrigerators, washing machines, air conditioners, and televisions), enclosures for electronic devices (such as personal computers, mobile phones, and smartphones), a member constituting a musical instrument (such as pianos, electric organs, and electronic musical instruments), vehicle members, such as those for automobiles and railway vehicles (interior materials, such as those for instrument panels, door trims, headlining, and tonneau covers; and exterior materials, such as those for bumpers).

In addition, examples of the plastic forming the plastic molded product include thermoplastic resins and thermosetting resins.

Examples of the thermoplastic resin include styrene-based resins, such as polystyrene; polyolefin-based resins, such as polyethylene and polypropylene; polyesters, such as poly(ethylene terephthalate) (PET); vinyl chloride-based resins, such as vinyl chloride resins; polyamides, such as polyamide 46, polyamide 6, polyamide 66, polyamide 610, polyamide 612, polyamide 1010, polyamide 1012, polyamide 11, polyamide 12, and polyamide 1212; polyphenylene ethers, such as poly(2,6-dimethyl-1,4-phenylene ether); homopolymers or copolymers of acrylonitrile, such as PAN resins, AS resins, ABS resins, AAS resins, ACS resins, AES resins, and AXS resins; (meth)acrylic resins; polycarbonate; polyacetal; polyphenylene sulfide; polyether ether ketone; polyamide imide; polyimide; polyether imide; polysulfone; poly(ether sulfone); modified products and derivatives of a resin of these, and polymer blends and polymer alloys containing these resins.

Examples of the thermosetting resin include phenolic resins, urea resins, melamine resins, unsaturated polyesters, furan resins, epoxy resins, polyurethane resins, allyl resins, and polyimide resins.

Plastic Molded Product

A plastic molded product provided with a coating composed of the cured product of the present disclosure on at least a portion of the surface has excellent properties, such as hardness, scratch resistance, and chemical resistance.

The thickness of the coating is not particularly limited and is, for example, approximately from 10 to 150 μm.

In addition, the plastic molded product formed of the composition for forming a polyurethane resin itself as a material has a surface composed of the cured product and thus likewise also has excellent properties, such as hardness, scratch resistance, and chemical resistance.

Each configuration, a combination of the configurations, and the like in each embodiment are an example, and various additions, omissions, substitutions, and other changes are possible as appropriate without departing from the spirit of the present disclosure. The present disclosure is not limited by the embodiments and is limited only by the claims.

EXAMPLES

Hereinafter, the present disclosure will be described more specifically with reference to examples, but the present disclosure is not limited by these examples.

Polyols, diisocyanates, and solvents used in examples are as follows.

Polyol

Polyol 1: a caprolactone adduct of tris(2-hydroxyethyl isocyanurate) (number average molecular weight 611, Mw/Mn=1.2, hydroxyl value 280 KOH mg/g)

Polyol 2: a caprolactone adduct of tris(2-hydroxyethyl isocyanurate) (number average molecular weight 1068, Mw/Mn=1.3, hydroxyl value 169 KOH mg/g)

303: PLACCEL 303 (poly(caprolactone triol), available from Daicel Corporation, number average molecular weight 400, Mw/Mn=1.2, hydroxyl value 544 KOH mg/g)

305: PLACCEL 305 (poly(caprolactone triol), available from Daicel Corporation, number average molecular weight 640, Mw/Mn=1.4, hydroxyl value 308 KOH mg/g)

309: PLACCEL 309 (poly(caprolactone triol), available from Daicel Corporation, number average molecular weight 987, Mw/Mn 1.5, hydroxyl value 188 KOH mg/g)

Diisocyanate

HDI: hexamethylene diisocyanate (available from Tosoh Corporation, molecular weight 168.2)

IPDI: isophorone diisocyanate (available from Sumika Covestro Urethane Co., Ltd., molecular weight 222.3)

Acrylic Polyol

A-801: Acrydic A-801 (available from DIC Corporation, hydroxyl value 50 KOH mg/g)

Solvent

Butyl acetate: a reagent available from Tokyo Chemical Industry Co., Ltd.

Synthesis Example A-1

To a five-neck flask equipped with a reflux condenser, a thermometer, a nitrogen gas inlet tube, and a stirring device were added 137 g of polyol 1 and 863 g of hexamethylene diisocyanate (HDI) under a nitrogen gas atmosphere, then the internal temperature was increased to 100° C. while the mixture was stirred, and the mixture was reacted for one hour. The resulting reaction solution was subjected to thin film distillation at 160° C. and 0.2 mm Hg, unreacted hexamethylene diisocyanate (HDI) was removed, and liquid polyisocyanate compound A-1 was obtained. The isocyanate group concentration of polyisocyanate compound A-1 was 11 wt. % as measured by the back titration method in accordance with the JIS K 1603-1 A method.

Synthesis Examples A-2 and A-3, and Comparative Synthesis Examples B-1 to B-4

Polyol 1, polyol 2, 303, 305, or 309, and diisocyanate (HDI) or diisocyanate (IPDI) were blended according to the weight ratio shown in Table 1 to give a total of 1000 g, reacted under similar conditions to those in Synthesis Example A-1, and polyisocyanate compounds A-2, A-3, and B-1 to B-4 were obtained.

Examples 1 to 3 and Comparative Examples 1 to 4

The polyisocyanate compound, acrylic polyol, and butyl acetate were mixed according to the weight ratio shown in Table 2, and a composition for forming a polyurethane resin was obtained.

The resulting composition was applied by spraying to a poly(ethylene terephthalate) film (Cosmoshine A4100 #100, available from Toyobo Co., Ltd.) to give a coating thickness of 50 μm, cured and dried in an oven at 70° C. for 30 minutes, and a cured coating/PET film laminate was obtained.

The cured coatings of the laminates obtained in the examples and comparative examples were evaluated for pencil hardness, scratch resistance, sunscreen resistance, elongation at break, and strength at break by the following methods.

Pencil Hardness

The pencil hardness of the cured coating side surface of the laminates obtained in the examples and comparative examples was evaluated by the method in accordance with JIS K5600, That is, the cured side surface of the laminate was rubbed with a pencil (pencil lead), and a laminate in which a scratch was observed on the surface was determined to be NG (poor). Specifically, the evaluation was performed using a pencil with a certain hardness, and when no scratch was made, another evaluation was performed with a pencil with a hardness one grade higher, and this operation was repeated. Once a scratch was observed, the laminate was re-evaluated with a hardness one grade lower, and when no scratch was observed, the laminate was evaluated again using a pencil with a hardness one grade higher. When reproducibility was confirmed twice or more, the hardness of the hardest pencil with which no scratch was made was determined as the pencil hardness of the cured coating.

Pencil for evaluation: a "Pencil for Pencil Hardness Test" available from Mitsubishi Pencil Co., Ltd.
Load: 750 gf
Scratch distance: 7 mm or longer
Scratch angle: 45°
Measurement environment: 23° C., 50% RH In the test were used laminates moisture-controlled in a constant temperature and humidity chamber at 23° C. and 50% RH for 24 hours.

Scratch Resistance

For the scratch resistance of the cured coating side surface of the laminates obtained in the examples and comparative examples, a scratch test was performed by attaching a steel wool (B-204, Bonstar for commercial use #0000) to a rubbing tester (Standard Model, available from Nippon Rika Industries Corporation) and reciprocating the steel wool (10 reciprocations) on the coating with a load of 500 g applied. The initial gloss (60-degree gloss) ($G_0$) before the scratch test on the cured coating side surface and the gloss (60-degree gloss) ($G_1$) after two minutes of the scratch test were measured using a gloss meter (Gloss Meter VG7000, available from Nippon Denshoku Industries Co., Ltd.), and the scratch resistance was evaluated by calculating the retention rate of the gloss by the following equation.

$$\text{Retention rate of gloss after scratch test} = (G_1)/(G_0) \times 100 (\%)$$

Evaluation Criteria

Excellent: The retention rate of the gloss was 95% or higher

Good: The retention rate of the gloss was lower than 95% and 90% or higher

Slightly poor: The retention rate of the gloss was lower than 90% and 80% or higher Poor: The retention rate of the gloss was lower than 80%

Sunscreen Resistance (Drip Method)

To the cured coating side surface of the laminates obtained in the examples and comparative examples was applied a sunscreen cream ("Ultra Sheer Dry-Touch SPF45" available from Neutrogena Corporation) to give 0.025 $g/cm^2$, and the laminate was allowed to stand in an oven at 50° C. for one hour. The sunscreen cream was then wiped off, and the appearance of the cured coating was evaluated according to the following criteria. Less change in the appearance indicates better chemical resistance.

Evaluation Criteria

Excellent: The cured coating had almost no change in the appearance

Good: A trace of a chemical liquid remained on the cured coating

Slightly poor: The cured coating swelled

Poor: The cured coating swelled and whitened

Elongation at Break and Strength at Break

A thermosetting polyurethane sheet 2 mm in thickness) with each composition (polyisocyanate composition+acrylic polyol) shown in Table 2 was prepared and formed into a type 3 dumbbell-shaped test piece (100 mm in length×25 mm in width×2 mm in thickness). Each dumbbell-shaped test piece was subjected to a tensile test using a Tensilon universal testing machine RTC-1350A (available from ORIENTEC Corporation) under an environment of 23° C. and 50% Rh in conditions of an inter-chuck distance of 60 mm and a tensile speed of 500 mm/min, and elongation (elongation at break) and maximum stress (strength at break) when the test piece was broken were measured. Higher elongation at break indicates superior flexibility.

Evaluation Criteria for Elongation at Break

Good: higher than 50%
Slightly poor: from 10% to 50%
Poor: lower than 10%

Evaluation Criteria for Strength at Break

Good: greater than 20 MPa
Slightly poor: from 10 to 20 MPa
Poor: less than 10 MPa The results are collectively shown in Table 2, The cured coatings shown in Examples 1 to 3 obtained using A-1 to A-3 as the polyisocyanate compound all had excellent hardness with a pencil hardness of 2B to H and exhibited excellent scratch resistance, excellent or good sunscreen resistance, good or slightly poor elongation at break, and good strength at break, and the cured coatings had excellent hardness, scratch resistance, chemical resistance, and flexibility accordingly.

The cured coatings shown in Comparative Examples 1 to 4 obtained using B-1 to B-4 having no isocyanurate group as the polyisocyanate compound were insufficient for any of scratch resistance, chemical resistance, or flexibility as described below. The cured coating of Comparative Example 1 had slightly poor scratch resistance and poor flexibility with poor elongation at break. In addition, the cured coating of Comparative Example 2 had poor chemical resistance with slightly poor sunscreen resistance. Furthermore, the cured coating of Comparative Example 3 had good scratch resistance and good sunscreen resistance but had slightly poor elongation at break, indicating insufficient overall performance. Moreover, the cured coating of Comparative Example 4 had slightly poor scratch resistance and poor chemical resistance with poor sunscreen resistance.

TABLE 1

| Weight ratio (wt. %) | | Synthesis Example | | | Comparative Synthesis Example | | | |
|---|---|---|---|---|---|---|---|---|
| | | A-1 | A-2 | A-3 | B-1 | B-2 | B-3 | B-4 |
| Polyol | 1 | 13.7 | 14.1 | 0 | 0 | 0 | 0 | 0 |
| | 2 | 0 | 0 | 20.8 | 0 | 0 | 0 | 0 |
| | 303 | 0 | 0 | 0 | 7.6 | 0 | 0 | 0 |
| | 305 | 0 | 0 | 0 | 0 | 12.6 | 13.0 | 0 |
| | 309 | 0 | 0 | 0 | 0 | 0 | 0 | 19.1 |
| Diisocyanate | HDI | 86.3 | 0 | 79.2 | 92.4 | 87.4 | 0 | 80.9 |
| | IPDI | 0 | 85.9 | 0 | 0 | 0 | 87.0 | 0 |
| Isocyanate group concentration | | 11 | 9 | 8 | 15 | 11 | 10 | 8 |

TABLE 2

| | | | Examples | | | Comparative Examples | | | |
|---|---|---|---|---|---|---|---|---|---|
| | | | 1 | 2 | 3 | 1 | 2 | 3 | 4 |
| Polyisocyanate composition | A-1 | Weight ratio (wt. %) | 20.4 | 0 | 0 | 0 | 0 | 0 | 0 |
| | A-2 | | 0 | 23.4 | 0 | 0 | 0 | 0 | 0 |
| | A-3 | | 0 | 0 | 25.6 | 0 | 0 | 0 | 0 |
| | B-1 | | 0 | 0 | 0 | 16.0 | 0 | 0 | 0 |
| | B-2 | | 0 | 0 | 0 | 0 | 20.4 | 0 | 0 |
| | B-3 | | 0 | 0 | 0 | 0 | 0 | 21.8 | 0 |
| | B-4 | | 0 | 0 | 0 | 0 | 0 | 0 | 25.6 |
| Acrylic polyol | A-801 | | 59.6 | 56.6 | 54.4 | 64.0 | 59.6 | 58.2 | 54.4 |
| Solvent | Butyl acetate | | 20.0 | 20.0 | 20.0 | 20.0 | 20.0 | 20.0 | 20.0 |
| Isocyanate group/ hydroxyl group | | Equivalent ratio | 1.0 | 1.0 | 1.0 | 1.0 | 1.0 | 1.0 | 1.0 |
| Pencil hardness | | | B | H | 2B | B | 2B | 2B | 2B |
| Scratch resistance (gloss retention ratio) | | | Excellent | Excellent | Excellent | Slightly poor | Good | Good | Slightly poor |
| Sunscreen resistance (drip method) | | | Excellent | Excellent | Good | Excellent | Slightly poor | Good | Poor |
| Elongation at break | | | Good | Slightly poor | Good | Poor | Slightly poor | Slightly poor | Good |
| Strength at break | | | Good | Good | Good | Good | Good | Good | Good |

To summarize the above, configurations of the present disclosure and their variations will be described in addition below.

[1] A polyisocyanate compound represented by Formula (1).

[2] The polyisocyanate compound according to [1], wherein $L^1$ of Formula (1) is an alkylene group having from 1 to 3 carbons (preferably an ethylene group).

[3] The polyisocyanate compound according to [1] or [2], wherein $L^2$ of Formula (1) is an alkylene group having from 1 to 8 carbons (preferably an alkylene group having from 4 to 6 carbons and more preferably a pentylene group).

[4] The polyisocyanate compound according to any one of [1] to [3], wherein $L^3$ of Formula (1) is a divalent aliphatic hydrocarbon group having from 4 to 18 carbons (preferably a divalent aliphatic hydrocarbon group having from 6 to 12 carbons and more preferably a hexamethylene group), a divalent alicyclic hydrocarbon group having from 4 to 18 carbons (preferably a divalent alicyclic hydrocarbon group having from 6 to 10 carbons and more preferably an isophorone residue), or a divalent aromatic hydrocarbon group having from 6 to 18 carbons.

[5] The polyisocyanate compound according to any one of [1] to [4], wherein m of Formula (1) is from 0 to 7.0 (preferably from 1.0 to 4.0 and more preferably from 1.0 to 3.0).

[6] The polyisocyanate compound according to any one of [1] to [5], wherein an isocyanate group concentration is from 6 to 14 wt. % (preferably from 7 to 13 wt. %, more preferably from 8 to 12 wt. %, and even more preferably from 9 to 12 wt. %), where an isocyanate group concentration of a compound having a blocked isocyanate group is a value obtained for a compound in which the blocked isocyanate group is replaced by an isocyanate group.

[7] The polyisocyanate compound according to any one of [1] to [6], wherein some or all of the isocyanate groups are blocked isocyanate groups blocked with a blocking agent.

[8] The polyisocyanate compound according to [7], wherein the blocking agent is one or more selected from imidazole-based compounds, alcohol-based compounds, phenol-based compounds, active methylene-based compounds, oxime-based compounds, lactam-based compounds, amine-based compounds, pyrazole-based compounds, and bisulfites.

[9] The polyisocyanate compound according to any one of [1] to [8], containing a multimer (a dimer to a hexamer) having a plurality of isocyanurate groups linked by a group represented by Formula (1b).

[10] A method of producing a polyisocyanate compound, the method of producing the polyisocyanate compound described in any one of [1] to [9], wherein a polyester polyol compound represented by Formula (1') and at least one diisocyanate selected from aliphatic diisocyanates, alicyclic diisocyanates, and aromatic diisocyanates are reacted.

[11] The method of producing a polyisocyanate compound according to [10], wherein the reaction is performed in an equivalent ratio of isocyanate groups of the diisocyanate to hydroxyl groups of the polyol compound (isocyanate groups/hydroxyl groups) ranging from 5 to 40 (preferably from 6 to 30 and more preferably from 7 to 20).

[12] The method of producing a polyisocyanate compound according to [10] or [11], wherein a number average molecular weight of the polyester polyol compound is from 570 to 2000 (preferably from 580 to 1500, more preferably from 590 to 1200, even more preferably from 590 to 1100, and particularly preferably from 590 to 900).

[13] The method of producing a polyisocyanate compound according to any one of [10] to [12], wherein a molecular weight dispersity (weight average molecular weight Mw/number average molecular weight Mn) of the polyester polyol compound is from 1.0 to 3.0.

[14] The method of producing a polyisocyanate compound according to any one of [10] to [13], wherein a hydroxyl value (KOH mg/g) of the polyester polyol compound is from 80 to 400 KOH mg/g (preferably from 110 to 350 KOH mg/g, more preferably from 150 to 300 KOH mg/g, even more preferably from 160 to 290 KOH mg/g, and particularly preferably from 180 to 285 KOH mg/g).

[15] A composition for forming a polyurethane resin, the composition containing the polyisocyanate compound described in any one of [1] to [9] and a polyacrylic polyol.

[16] The composition for forming a polyurethane resin according to [15], wherein an equivalent ratio of a total of isocyanate groups and blocked isocyanate groups of the polyisocyanate compound to hydroxyl groups in the polyacrylic polyol ((isocyanate groups+blocked isocyanate groups)/hydroxyl groups) in the composition is from 0.5 to 2.0 (preferably from 0.5 to 1.5, more preferably from 0.7 to 1.3, and even more preferably from 0.9 to 1.2).

[17] The composition for forming a polyurethane resin according to [15] or [16], wherein a content of the polyacrylic polyol in the composition is from 100 to 400 parts by weight (preferably from 150 to 350 parts by weight and more preferably from 200 to 300 parts by weight) per 100 parts by weight of the polyisocyanate compound.

[18] The composition for forming a polyurethane resin according to any one of [15] to [17], wherein a hydroxyl value of the polyacrylic polyol is from 30 to 100 KOH mg/g (preferably from 40 to 80 KOH mg/g).

[19] The composition for forming a polyurethane resin according to any one of [15] to [18], the composition further containing an inorganic particle and/or an organic particle.

[20] The composition for forming a polyurethane resin according to [19], wherein a particle size of the inorganic particle and the organic particle is from 0.01 nm to 1 μm.

[21] The composition for forming a polyurethane resin according to any one of [15] to [20], the composition further containing a solvent.

[22] The composition for forming a polyurethane resin according to [21], wherein the solvent is an acetate ester (preferably butyl acetate).

[23] The composition for forming a polyurethane resin according to [21] or [22], wherein a content of the solvent in the composition is from 5 to 20 parts by weight (preferably from 7 to 17 parts by weight and more preferably from 9 to 15 parts by weight) per 100 parts by weight of a total of the polyisocyanate compound and the polyacrylic polyol.

[24] The composition according to any one of [15] to [23], wherein the composition is a coating agent.

[25] A cured product of the composition described in any one of [15] to [24].

[26] A plastic molded product, wherein a coating composed of the cured product described in [25] covers at least a portion of a surface of the plastic molded product.

Industrial Applicability

The polyisocyanate compound of the present disclosure can be used as a curing agent in a composition for forming a polyurethane resin, the composition to form a cured product with excellent hardness, scratch resistance, chemical resistance, and flexibility, and using the composition for forming a polyurethane resin of the present disclosure as a coating agent to cover a substrate forms a coating of a cured product, the coating having excellent flexibility and being less likely to peel off, and enables the substrate to have hardness, scratch resistance, and chemical resistance. Thus, the present disclosure has industrial applicability.

The invention claimed is:

1. A composition for forming a polyurethane resin, comprising:
a polyisocyanate compound represented by Formula (1):

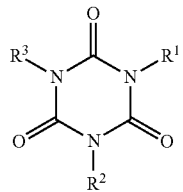

wherein $R^1$ to $R^3$ are identical or different and are a group represented by Formula (1a):

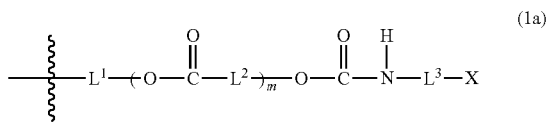

wherein in Formula (1a), $L^1$ and $L^2$ are identical or different and represent an alkylene group having from 1 to 10 carbons, m represents a number of 0 or greater, $L^3$ represents a divalent hydrocarbon group having from 4 to 18 carbons, and X represents an isocyanate group or a blocked isocyanate group blocked with a blocking agent, where m is not simultaneously 0 for $R^1$ to $R^3$, and the bond with the wavy line bonds to a nitrogen atom in the formula; and
a polyacrylic polyol.

2. The composition for forming a polyurethane resin according, to claim 1, wherein an isocyanate group concentration in said polyisocyanate compound is from 6 to 14 wt. %, where an isocyanate group concentration of a compound having a blocked isocyanate group is a value obtained for a compound in which the blocked isocyanate group is replaced by an isocyanate group.

3. The composition for forming a polyurethane resin according to claim 1, wherein an equivalent ratio of a total of isocyanate groups and blocked isocyanate groups of the polyisocyanate compound to hydroxyl groups in the polyacrylic polyol ((isocyanate groups+blocked isocyanate groups)/hydroxyl groups) in the composition is from 0.5 to 2.0.

4. The composition for forming a polyurethane resin according to claim 1, wherein the composition is a coating agent.

5. The composition for forming a polyurethane resin according to claim 1, wherein $L^1$ in Formula (1a) is an alkylene group having from 1 to 3-carbons.

6. The composition for forming a polyurethane resin according to claim 1, wherein $L^2$ in Formula (1a) is an alkylene group having from 1 to 8 carbons.

7. The composition for forming a polyurethane resin according to claim 1, wherein $L^3$ in Formula (1a) is a divalent aliphatic hydrocarbon group having from 4 to 18 carbons, a divalent alicyclic hydrocarbon group having from 4 to 18 carbons, or a divalent aromatic hydrocarbon group having from 6 to 18 carbons.

8. The composition for forming a polyurethane resin according to claim 1, wherein $L^3$ in Formula (1a) is a hexamethylene group.

9. The composition for forming a polyurethane resin according, to claim 1, wherein $L^3$ in Formula (1a) is an isophorone residue.

10. The composition for forming a polyurethane resin according to claim 1, wherein m in Formula (1a) is from 0 to 7.0.

11. The composition for forming a polyurethane resin according to claim 1, wherein a content of the polyacrylic polyol in the composition is from 100 to 400 parts by weight per 100 parts by weight of the polyisocyanate compound.

12. The composition for forming a polyurethane resin according to claim 1, wherein a hydroxyl value of the polyacrylic polyol is from 30 to 100 KOH mg/g.

13. A cured product of the composition for forming a polyurethane resin described in claim 1.

14. A plastic molded product, wherein a coating comprising the cured product described in claim 13 covers at least a portion of a surface of the plastic molded product.

* * * * *